Jan. 7, 1964     H. E. ROSENBERGER ETAL     3,116,662
SLIDE PREHEATING MEANS FOR PROJECTORS
Original Filed Dec. 26, 1956     2 Sheets-Sheet 2
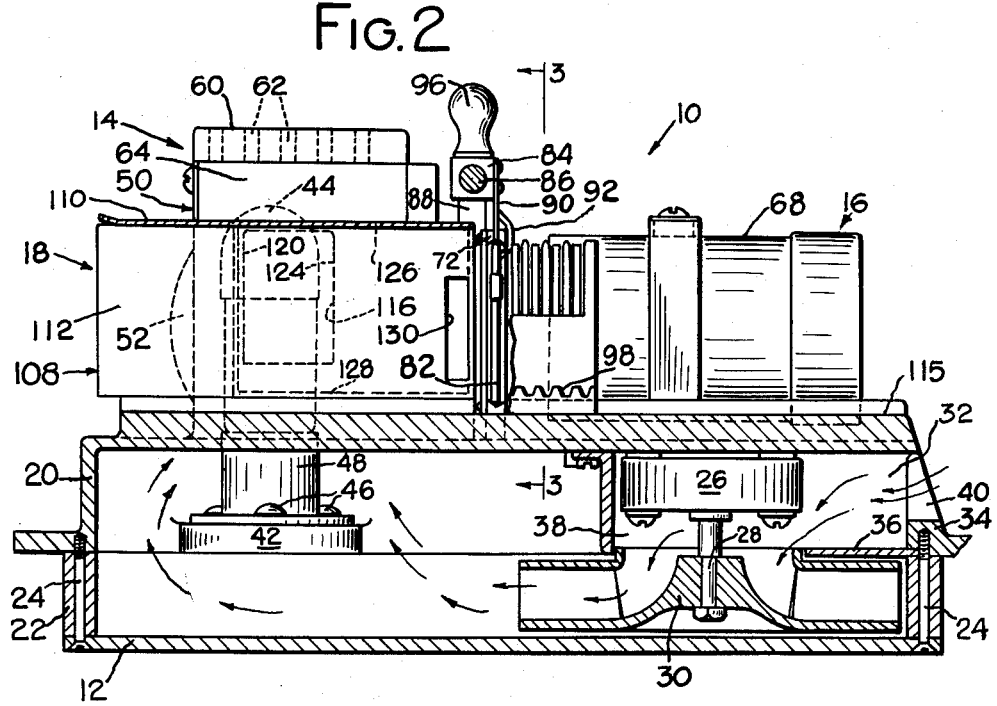
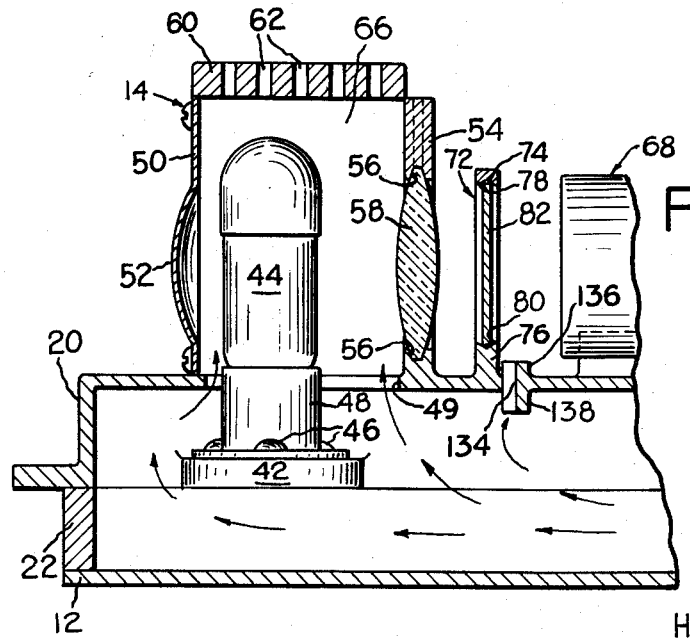
INVENTORS
HAROLD E. ROSENBERGER
BY RICHARD F. SCHUMA
ATTORNEYS

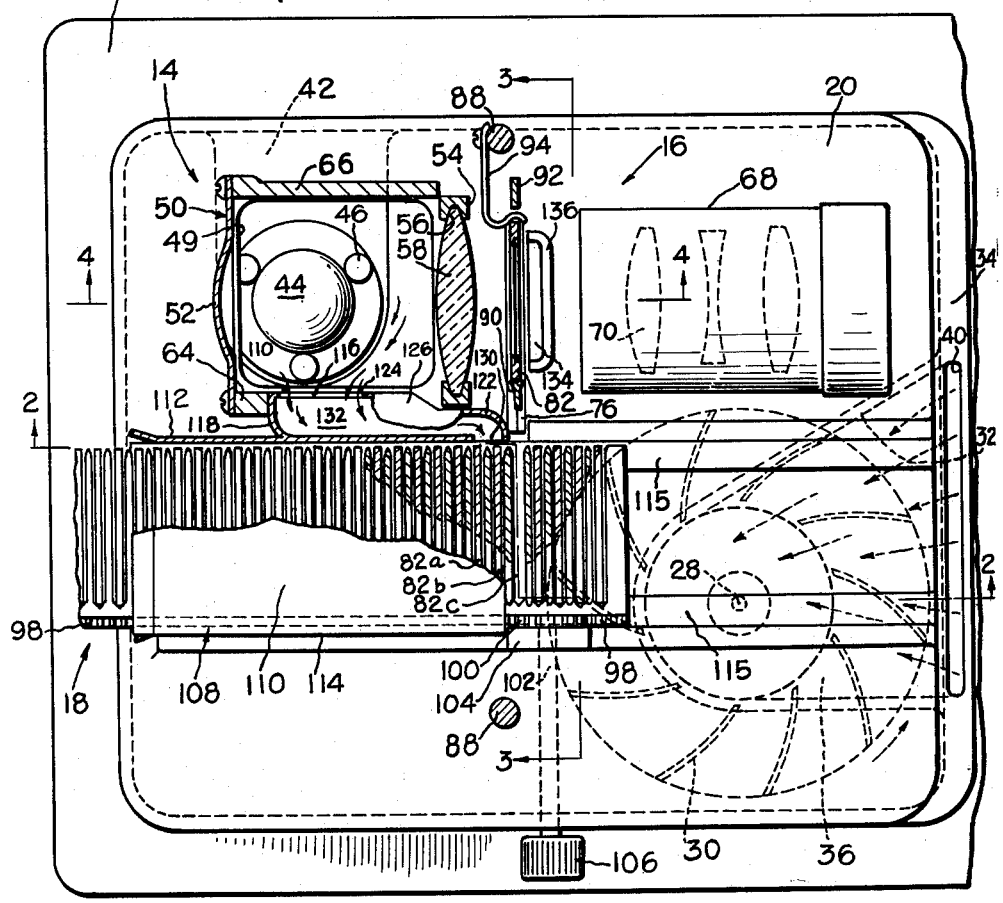
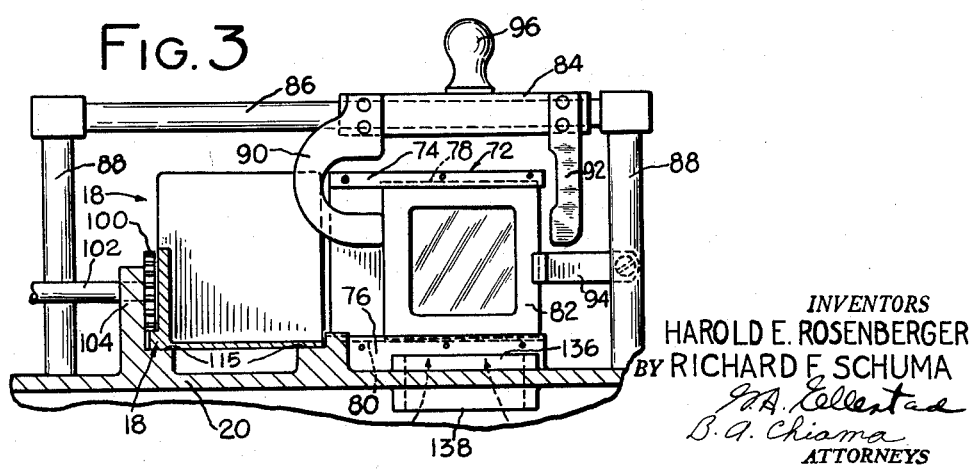

United States Patent Office 3,116,662
Patented Jan. 7, 1964

3,116,662
SLIDE PREHEATING MEANS FOR PROJECTORS
Harold E. Rosenberger, Brighton, N.Y., and Richard F. Schuma, Santa Barbara, Calif., assignors to Bausch & Lomb Incorporated, Rochester, N.Y., a corporation of New York
Continuation of application Ser. No. 630,479, Dec. 26, 1956. This application Feb. 23, 1962, Ser. No. 176,487
3 Claims. (Cl. 88—28)

This invention relates to projection apparatus and more particularly it has reference to projectors of the type which are used to project images of transparencies such as films and slides.

This is a continuation of our copending application Serial No. 630,479, filed December 26, 1956, now abandoned.

Films which are supported only at their edges during projection, are subject to buckling under the action of heat which reaches the film from the projection light source. Therefore, when projecting an image on a screen, the operator would initially focus the projector for a slide as the same is brought into projecting position, and after buckling or "popping" has occurred he would have to refocus the projector in order to have the projected image sharply in focus. In the widely used colored film transparencies or "slides," the emulsion coated film is held in apertured cardboard mounts so that the picture area is unsupported and when such slides are projected they are subject to buckling due to heat in the projected light beam so that refocusing of the projector is necessitated.

One of the objects of this invention is to provide a projector which will overcome the aforementioned disadvantages.

Another object of the present invention is to provide a projector in which slides are pre-conditioned in order to buckle them before they are stationed in projection position.

The present invention takes the form of an improvement for slide projectors and comprises an electrically operated fan which is adapted to draw cool surrounding air into the projector for cooling the same. An air duct is arranged in the projector and has its inlet located in such a relationship with the housing for the light source for receiving a portion of the hot air in the vicinity of the light source. The outlet of the air duct is so situated as to direct the flow of hot air onto a plurality of slides which are located in a slide magazine tray adjacent the position from which a manual or automatic sliding mechanism will engage a slide to move the same into viewing position. In this manner, hot air, of a temperature sufficient to buckle the film, is applied to a number of slides before they are moved into alignment with the optical system of the projector thereby inducing buckling of the film in the slides and conditioning the film for the particular projecting arrangement of the optical system.

A second or auxiliary air duct is also arranged in the projector and has its inlet located between the high pressure or downstream side of the fan and the light source for directing cool air to a slide which is in projecting position adjacent the condenser lens. This duct serves to direct the flow of cool air to the slide in order to prevent the excessive heat, generated by the light source and transmitted through the condenser lens, from damaging the film in the slide. As will appear hereinafter, the novel aspect of this invention resides in the arrangement of the air flow means relative to the fan and the light source and the hot air duct for the pre-conditioning of the slides.

Other objects and advantages will appear from the following description taken in conjunction with the drawings wherein:

FIG. 1 is a plan view, partly in section, showing the present invention incorporated in a slide projector;

FIG. 2 is a sectional view taken on the line 2—2 of FIG. 1;

FIG. 3 is a fragmentary sectional view through part of the magazine tray and optical system as viewed along the line 3—3 of FIG. 1 and the line 3—3 of FIG. 2; and FIG. 4 is a fragmentary sectional view as viewed along the line 4—4 of FIG. 1.

A conventional slide projector is shown generally at 10 in FIG. 1 and comprises a base or casing 12, a lamp housing 14, an optical system or lens assembly generally indicated at 16 and a slide magazine tray generally indicated at 18.

As shown in FIGS. 2 and 4, the base 12 consists of upper and lower dish-shaped castings 20 and 22, respectively, and these are fastened together along their rims by bolts 24. Mounted interiorly and adjacent one end of the base is an electric motor 26 which serves to rotate a shaft 28 extending vertically downwardly from the motor. A radial flow impeller 30 is mounted and secured to the remote end of the shaft 28. A vertically disposed baffle plate 32 having its ends secured to an end wall 34 of the upper casting 20 and curved around the motor 26 cooperates with the undersurface of the casting 20 and a horizontally projecting plate 36 to form a manifold 38 for the fan 30. The manifold serves to converge the air flow entering the base 12 from a slit 40 formed in the wall 34, as shown by the arrows.

Projecting laterally from one wall of the upper casting 20 and integrally therewith and extending inwardly of the base is a plate 42 for supporting a light source or bulb 44. Suitable bolts 46 are used to fasten the bulb socket 48 to the plate 42, as shown in FIG. 4. A bulb shield or housing 50 in the form of a box of various parts, is secured to the upper casting 20 by any suitable means and is in communication with the chamber formed in the base 12 through an outlet 49 of the chamber. To the rear of the shield 50 is attached a reflector 52 while at the forward end of the shield there is a wall 54 having grooves 56 for receiving and retaining the edges of condensing lens 58. The top of the shield is covered with a plate 60 having a plurality of apertures 62 for permitting the escape of some of the heat developed in the housing 50 by the light source. To complete the structure of the shield 50, a pair of parallel spaced apart side walls 64, 66 are fastened to and between the reflector 52 and the front wall 54, with the side wall 64 positioned between the bulb 44 and the tray 18.

The condensing lens 58 constitutes part of the optical system 16 and cooperating with the lens 58 is an objective lens 68 adjustably mounted on the upper casting 20 in any suitable manner but in such a position as to be in the path of the projected light beam. Intermediate the condensing lens 58 and the adjacent element 70 of the objective lens 68 and coaxially aligned therewith is a slide frame holder 72 which may be rigidly mounted on the casting 20. The holder 72 comprises a pair of upper and lower rails 74, 76 which are formed with inwardly opposed grooves 78, 80, respectively, for slidingly holding a film slide 82 which, when in the position shown in FIG. 3, is in the path of the projected light beam.

The film slide 82 is normally carried in the magazine tray 18 which may house anywhere up to 48 slides and for purposes of the invention any suitable sliding mechanism of the automatic or manually actuated type may be employed to remove a slide from the tray 18, position it in the frame holder 72 and return the slide to its previous position within the tray. For purposes of simplicity, a manually actuated sliding mechanism is shown and takes the form of a slide head 84 slidably mounted on a horizontally disposed rail 86 which is mounted on the base 12 by a pair of uprights 88 secured thereto. A curved finger 90 is secured to one end of the head 84 and serves to remove the slide 82 from the tray 18 and a second finger 92 secured to the other end of the head serves to return the slide to the tray when the head 84 is moved to the left and right, respectively.

In the position, shown in FIG. 3, the finger 90 has completed its movement to the right and has carried along therewith the slide 82. In this position of the slide, both the finger 90 and a stop arm 94 secured to and projecting from one of the uprights 88 serve to maintain the slide 82 in a relatively rigid and centered projection position between the lenses 58 and 68. Movement of the head 84 to the left will disengage the slide from the finger 90 and bring the finger 92 in engagement with the edge of the slide whereupon further leftward movement of the head will return the slide to tray. A handle 96 mounted on the head 84 facilitates the sliding movement of the head on the rail 86 between the uprights 88. Normally the head 84 is in a position to the extreme left of that shown in FIG. 3 in order to permit the movement of the tray 18. Further description of this operation of the sliding mechanism is unnecessary since these mechanisms are old and within the knowledge of those skilled in the art.

The magazine tray 18 may be of any suitable type and for purposes of description, a type employing a gear rack 98 is shown. The gear rack 98 may be formed on the frame of the tray or be a separate rack mounted in the tray and is utilized for feeding the tray in one direction for positioning each of the various film slides 82 successively in alignment with the slide frame 72. A gear 100, secured to one end of a shaft 102 which is rotatably mounted in an upstanding portion 104 of the base 12, serves to move the tray 18 upon step by step rotation of the shaft 102. A knob 106 on the other end of the shaft remote from the gear 100 is provided to facilitate manual rotation of the gear. It will be apparent that an operator may position a film slide to be projected in alignment with the frame 72 by simply manipulating the knob 106 until this is accomplished. By actuating the head 84 to its position shown in FIG. 3 a slide 82 will be removed from the tray and positioned in the frame 72.

The magazine tray 18 is adapted to be inserted in a tunnel or tray container 108 which comprises a top plate 110 and side plates 112, 114 secured together and with the upper casting 20 to form an elongated box-like frame open at both ends to permit the movement of the tray 18 therethrough. The tray is adapted to be supported on and guided by a pair of elongated shoulders 115 formed on the casting 20 immediately below the holder 108.

As seen in FIGS. 1 and 2, the side wall 64 of the housing or bulb shield 50 is formed with a generally rectangular opening 116 in immediate adjacency to the bulb 44. A curved plate 118 is connected at one end to the wall 64 along one edge 120 of the opening 116 and at the other end to the wall 112 of the container 108. An angled wall 122 is connected at one end to the wall 64 along the other edge 124 of opening 116 remote from the edge 120 and at the other end to the wall 112. Both the plate 118 and the wall 122 extend vertically between and are connected to an extension 126 of the top plate 110 and a similarly shaped plate 128 projecting from the lower end of the wall 112. The wall 112 is formed with a relatively narrow rectangular cut out or vent 130 along its forward edge and as shown in FIG. 2, this cut out opening is of slightly smaller area than the opening 116.

It will be apparent that the plate 118, the walls 112, 122, the top wall extension 126 and the bottom plate 128 define an enclosed chamber 132 which serves as an air duct for the passage of air therethrough. The chamber 132 is in communication with the space defined by the housing 50 so as to receive some of the heat developed by the bulb 44. Similarly, the opening 130 connects the chamber 132 with the space within the container 108.

As shown in FIG. 1, the opening 130 is aligned with at least two slides 82a, 82b which are immediately behind the normal position 82c of the slide 82 in the tray 18. In this manner, each of the slides 82a, 82b will be opposite the opening 130 for two positionings of the tray during the course of successive projection of the slides 82. When the slide 82 is moved back to its position on the tray and the latter is advanced a distance of one slide spacing, the slide 82b will be in position to be moved into projecting position and the slide 82a will be in the position formerly occupied by the slide 82b. The slide immediately behind the slide 82a will occupy the position previously occupied by the slide 82a after the latter is advanced.

Another air duct is provided in the projector 10 and to this end, the upper casting 20 of the base 12 is provided with an opening 134 located between the lenses 58 and 70 and adjacent the lower rail 76. Baffle plates 136 are fastened upon the upper and lower surfaces of the casting in order to extend the depth of the opening 134 and control the flow of air therethrough. As shown by the arrows in FIGS. 2 and 3, air flows from the interior of the base 12, through the opening 134 and is directed along the adjacent surface of the slide 82 for a purpose which will appear hereinafter.

*Operation*

It will be assumed that the electric current supply (not shown) for the projector 10 is such as to be able to energize the electric motor 26 and the bulb 44 simultaneously, or, at least, will permit operation of the motor before the bulb is allowed to become energized. Since circuits of this sort are well known in the art, further description of the same will be unnecessary.

With the motor 26 energized and the fan 30 rotating, relatively cool air will be drawn from the surrounding atmosphere through the slot 40 and into the base 12 which will serve as an air duct for the transmission of air. As previously indicated, the baffles 36 will permit the funneling of air into the fan intake in order to increase the efficiency of the fan. The flow of air is then directed upwardly through the outlet 49 and into the lamp housing 50 where the air is permitted to circulate around the bulb 44 to be heated thereby. Some of the air is then allowed to escape through the openings 62 formed in the top cover 60 of the shield in order to permit cooling of the bulb 44. It will be apparent that in the movement of air just described, the air flow is rather rapid in view of the work imposed upon the air by the fan 30, thus permitting efficient cooling of the bulb 44.

Some of the hot air flowing through the housing 50 is conducted past the opening 116 and through the duct or chamber 132, being forced therefrom through the opening 130. The hot air flowing through the opening 130 impinges upon both surfaces of the two film slides 82a, 82b causing buckling of the same as they stand in readiness to be moved into projecting position. It will be noted that the relative areas of the openings 116 and 130 are such as to cause a relatively faster rate of flow of the hot air through the opening 130 for heating the slides. The areas of these parts, the fan capacity and the openings 62 are accordingly dimensioned in order to allow only enough heat to come in communication with the film slides for causing buckling without any danger of damaging the film in the slides.

Some of the cool air under pressure in the base 12 flows through the opening 134 and impinges upon the slide 82, which is in projecting position, in order to cool the same against the heat that is developed in the vicinity of the slide by the light source and transmitted through the condensing lens 58. The opening 134 is of an area to allow only enough air to pass therethrough for cooling the slide to prevent the overheating of the slide and damage thereof.

As the slide 82 is returned to slot 82c in the tray 18 it still is in a heated and popped condition. The returned slide operates as a heat barrier in the slide tray tending to minimize the loss of heat due to radiation and convection currents which facilitates film buckling or popping by uniformly heating, and maintaining an even temperature of the films next to be moved into projection position.

From the foregoing description, it will be appreciated that the present invention provides means for directing the flow of hot air upon a plurality of film slides just prior to their movement into projecting position thereby inducing buckling or "popping" of the film. This preconditioning of the film slides and maintaining of the popped condition of the slide obviates the need for refocusing the slide when in projecting position and results in a continuous accurately-focused projection of all the slides which are to be projected. It will also be appreciated that the work upon the air is performed by a fan located between the intake of the projector base and the bulb thereby eliminating the heating of the fan and motor by the bulb. The length of the duct between the lamp housing and the slides to-be-preconditioned is held to a minimum, consequently more heat is available to utilize in the pre-conditioning step while at the same time allowing most of the heat to escape from the shield for efficient cooling of the bulb.

While there is in this application specifically described one form which the invention may assume in practice, it will be understood that this form is shown for purpose of illustration, and that the same may be modified and embodied in various other forms or employed in other uses without departing from its spirit or the scope of the appended claims.

We claim:

1. A projection apparatus comprising in combination, a light source, a housing defining a chamber means receiving said light source, a slide holder holding a slide in the projecting position, a lens system aligned with said light source and said slide holder, a slide tray, a tray retainer receiving said tray, a slide transfer mechanism associated with said tray for transferring slides from said tray to said slide holder and for returning slides from said holder to said tray, air moving means, passage means communicating with said air moving means and said chamber means directing the flow of cooling air through said chamber means, first communicating means connecting said chamber means and said tray retainer providing flow of heated air from said chamber means around a plurality of slides to preheat and prepop the slides prior to positioning in said slide holder, a second communicating means connected to said air moving means directing air over the slide in said slide holder and maintaining the desired slide temperature of the slide disposed in said holder.

2. A projection apparatus comprising in combination, a light source, a housing defining a chamber means receiving said light source, a slide holder holding a slide in a projecting position, a lens system aligned with said light source and said slide holder, a tray retainer mounted adjacent said slide holder, a slide tray received in said tray retainer, slide transfer mechanism associated with said tray for transferring a slide from said tray to said slide holder, air moving means, passage means communicating with said air moving means and said chamber means conveying cooling air through said chamber means, a first communicating means connecting said chamber means with said tray retainer conveying heated air for heating and pre-popping of slides prior to transfer to said slide holder, a second communicating means connected to said air moving means conveying air to said slide holder thereby preventing overheating of the slide in said slide holder and maintaining a uniformly heated and popped condition on the slide in the projecting position, said slide transfer mechanism returning the heated slide to said tray subsequent to projection of the image, the returned heated slide thereby providing a heat barrier in said tray for minimizing heat loss and stabilizing the temperature of the slides in said tray prior to transfer to said slide holder.

3. A projection apparatus comprising in combination, a light source, a housing defining a chamber means receiving said light source, a slide holder associated with said light source, a lens system aligned with said light source and said slide holder, air pressurizing means mounted in the projection apparatus, passage means communicating with said pressurizing means and said chamber means providing conveyance of cooling air through said chamber means, a tray retainer adjacent said slide holder, a slide tray received in said tray retainer, transfer means associated with said tray for transferring a slide from said tray to said holder and returning the slide from said holder to said tray, a first communicating means connecting said chamber means and said tray retainer to provide passage of heated air from said chamber means for pre-popping of slides immediately prior to transfer of the slide in the tray to said holder, a second communicating means connected to said air pressurizing means directing air on the slide in said slide holder maintaining a pre-popped condition of the slide therein and preventing overheating of said slide during projection of the image from the slide in said holder, said transfer means returning said slide from said holder to said tray thereby providing a heat barrier to minimize heat loss in said tray due to convection currents and radiation within said tray for maintaining a uniform temperature of the slides in said tray adjacent said slide holder.

References Cited in the file of this patent

UNITED STATES PATENTS

| | | |
|---|---|---|
| 2,038,784 | Ghadiali | Apr. 28, 1936 |
| 2,294,219 | Woermann | Aug. 25, 1942 |
| 2,362,601 | Wengel | Nov. 14, 1944 |
| 2,590,492 | Bennet et al. | Mar. 25, 1952 |
| 2,627,017 | Howard | Jan. 27, 1953 |
| 3,000,258 | Misuraca | Sept. 19, 1954 |

UNITED STATES PATENT OFFICE
CERTIFICATE OF CORRECTION

Patent No. 3,116,662                 January 7, 1964

Harold E. Rosenberger et al.

It is hereby certified that error appears in the above numbered patent requiring correction and that the said Letters Patent should read as corrected below.

Column 3, line 19, before "tray" insert -- the --; column 6, line 15, for "on" read -- of --.

Signed and sealed this 9th day of June 1964.

(SEAL)
Attest:

ERNEST W. SWIDER
Attesting Officer

EDWARD J. BRENNER
Commissioner of Patents